United States Patent
Ichihara

(10) Patent No.: US 7,236,874 B2
(45) Date of Patent: Jun. 26, 2007

(54) TORQUE CONTROL APPARATUS AND VEHICLE CONTROL SYSTEM HAVING THE SAME

(75) Inventor: Hideaki Ichihara, Obu (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/399,403

(22) Filed: Apr. 7, 2006

(65) Prior Publication Data

US 2006/0229158 A1    Oct. 12, 2006

(30) Foreign Application Priority Data

Apr. 8, 2005    (JP)    ............... 2005-112387

(51) Int. Cl.
  *G06F 19/00*    (2006.01)
  *F02D 41/12*    (2006.01)

(52) U.S. Cl. ............... 701/112; 701/70; 701/84; 701/86; 123/325; 123/198 DB

(58) Field of Classification Search ............ 701/104, 701/112, 114, 70, 84, 86; 477/182–185; 123/325, 481, 198 F, 198 DB, 333, 493
See application file for complete search history.

(56) References Cited

U.S. PATENT DOCUMENTS

| | | | | |
|---|---|---|---|---|
| 4,809,660 A | * | 3/1989 | Marsh et al. | ............... 477/52 |
| 5,245,966 A | * | 9/1993 | Zhang et al. | ........... 123/339.19 |
| 5,463,551 A | * | 10/1995 | Milunas | ............... 701/91 |
| 5,519,617 A | * | 5/1996 | Hughes et al. | ............... 701/84 |
| 6,993,427 B2 | * | 1/2006 | Ueda | ............... 701/111 |
| 7,130,737 B2 | * | 10/2006 | Biester et al. | ............... 701/110 |

FOREIGN PATENT DOCUMENTS

JP    11-50889    2/1999

* cited by examiner

*Primary Examiner*—Stephen K. Cronin
*Assistant Examiner*—Johnny H. Hoang
(74) *Attorney, Agent, or Firm*—Nixon & Vanderhye P.C.

(57) ABSTRACT

In an engine torque loss computing section, a pump loss computing section computes a pump torque loss, and a frictional loss computing section computes a frictional torque loss. The pump torque loss and the frictional torque loss are summed to obtain an engine torque loss. Furthermore, a torque loss correction amount computing section computes a torque loss correction amount, and a correction amount changing section changes the torque loss correction amount based on a result of determination of whether fuel cut-off is currently executed. The torque loss correction amount is added to the uncorrected initial engine torque loss to obtain a corrected engine torque loss.

14 Claims, 15 Drawing Sheets

COMBUSTION PERIOD FRICTIONAL TORQUE LOSS

F/C PERIOD FRICTIONAL TORQUE LOSS

TORQUE CONTROL APPARATUS AND VEHICLE CONTROL SYSTEM HAVING THE SAME

CROSS REFERENCE TO RELATED APPLICATION

This application is based on and incorporates herein by reference Japanese Patent Application No. 2005-112387 filed on Apr. 8, 2005.

BACKGROUND OF THE INVENTION

1. Field of the Invention

The present invention relates to a torque control apparatus and a vehicle control system having the same.

2. Description of Related Art

In a previously proposed control system of an internal combustion engine of a vehicle, a torque demand (also referred to as a demanded torque) is computed based on an operational amount (an accelerator operational amount or alternatively referred to as an opening degree) of an accelerator operated by a driver, and then actuators of the engine are operated to achieve this torque demand. For example, according to Japanese Unexamined Patent Publication No. 11-50889, a target shaft torque of an engine is computed based on an accelerator operational amount and an engine rotational speed, and a combustion pressure torque is computed based on the target shaft torque and an engine operational state. Then, a target intake air quantity is computed based on the combustion pressure torque, and an opening degree of a throttle valve is controlled in a manner that achieves the target intake air quantity. Furthermore, at the time of computing the combustion pressure torque, a frictional torque loss, a pump torque loss and an indicated torque are computed based on the engine operational state (e.g., an engine rotational speed, an engine coolant temperature, an engine load), and the combustion pressure torque is computed based on them.

However, the combustion state of the engine changes with time. Therefore, for example, a cylinder temperature and a cylinder pressure change due to the change in the combustion state. Accordingly, the torque loss also changes. For example, a torque loss in a fuel cut-off period differs from a torque loss in a normal combustion period. In such a case, the torque loss cannot be accurately computed, and thereby a torque demand, which is demanded by a driver, cannot be achieved.

Lately, development of a torque based control system is in progress for implementing its commercial use. The torque based control system collectively controls operation of various actuators in addition to the engine based on the torque demand, which is demanded by a driver. In this torque based control system, when the torque demand cannot be met in the engine, a torque balance relative to the other actuators is deteriorated, so that the desired vehicle control cannot be implemented. For example, in a case of a brake control apparatus, which controls braking of the vehicle, at the time of decelerating the vehicle, the torque demand may be met by a brake system. However, at this time, in the engine side, fuel cut-off is executed, and thereby an error in an engine torque occurs due to a change in a torque loss caused by the fuel cut-off. Therefore, in such a case, a demanded deceleration may not be achieved.

SUMMARY OF THE INVENTION

The present invention addresses the above disadvantages. Thus, it is an objective of the present invention to provide a torque control apparatus, which achieves improved torque control of an internal combustion engine. It is another objective of the present invention to provide an engine control system having such a torque control apparatus.

To achieve the objectives of the present invention, there is provided a torque control apparatus for an internal combustion engine. The torque control apparatus includes a combustion stop means, a combustion period torque loss computing means, a combustion stop period torque loss computing means and a torque control means. The combustion stop means is for stopping fuel combustion of the engine when a combustion stop condition is satisfied. The combustion period torque loss computing means is for computing a torque loss of the engine in a combustion period, in which the fuel combustion of the engine takes place. The combustion period torque loss computing means computes the torque loss of the engine based on an operational state of the engine in the combustion period. The combustion stop period torque loss computing means is for computing a torque loss of the engine in a combustion stop period, in which the fuel combustion of the engine is stopped by the combustion stop means. The combustion stop period torque loss computing means computes the torque loss of the engine in the combustion stop period based on the torque loss of the engine in the combustion period and a state of the combustion stop implemented by the combustion stop means. The torque control means is for controlling a torque generated from the engine based on a torque demand, which is demanded by an operator, and a selected one of the torque loss in the combustion period and the torque loss in the combustion stop period. In the combustion period, the torque control means uses the torque loss computed by the combustion period torque loss computing means as the selected one of the torque losses. In the combustion stop period, the torque control means uses the torque loss computed by the combustion stop period torque loss computing means as the selected one of the torque losses.

To achieve the objectives of the present invention, there is also provided a torque control apparatus for an internal combustion engine. The torque control apparatus includes a combustion stop means, a first computing means, a second computing means and a torque loss computing means and a torque control means. The combustion stop means is for stopping fuel combustion of the engine when a combustion stop condition is satisfied. The first computing means is for computing a torque loss of the engine based on a torque loss characteristic in a combustion period, in which the fuel combustion of the engine takes place. The second computing means is for computing a torque loss of the engine based on a torque loss characteristic in a combustion stop period. The torque loss characteristic in the combustion stop period is different from the torque loss characteristic in the combustion period. The torque loss computing means is for computing a conclusive torque loss of the engine based on a selected one of the torque loss computed by the first computing means and the torque loss computed by the second computing means. In the combustion period, the torque loss computing means uses the torque loss computed by the first computing means as the selected one of the torque losses. In the combustion stop period, the torque loss computing means uses the torque loss computed by the second computing means as the selected one of the torque losses. The torque control means is for controlling a torque generated from the engine based on a torque demand, which is demanded by an operator, and the conclusive torque loss of the engine.

To achieve the objectives of the present invention, there is also provided a vehicle control system, which controls a plurality of in-vehicle devices including an internal combustion engine of a vehicle in a manner that achieves a torque demand. The vehicle control system includes the torque control apparatus described above.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to the accompanying drawings. In the present embodiment, an electronic control unit (hereinafter, referred to as "ECU") acts as a core unit of an engine control system (constituting a part of a vehicle control system) that controls an in-vehicle multi-cylinder gasoline engine (serving as an internal combustion engine), more specifically, for example, a fuel injection quantity and ignition timing of the engine. First, an entire structure of the engine control system will be described with reference to FIG. 1.

Figure 1:
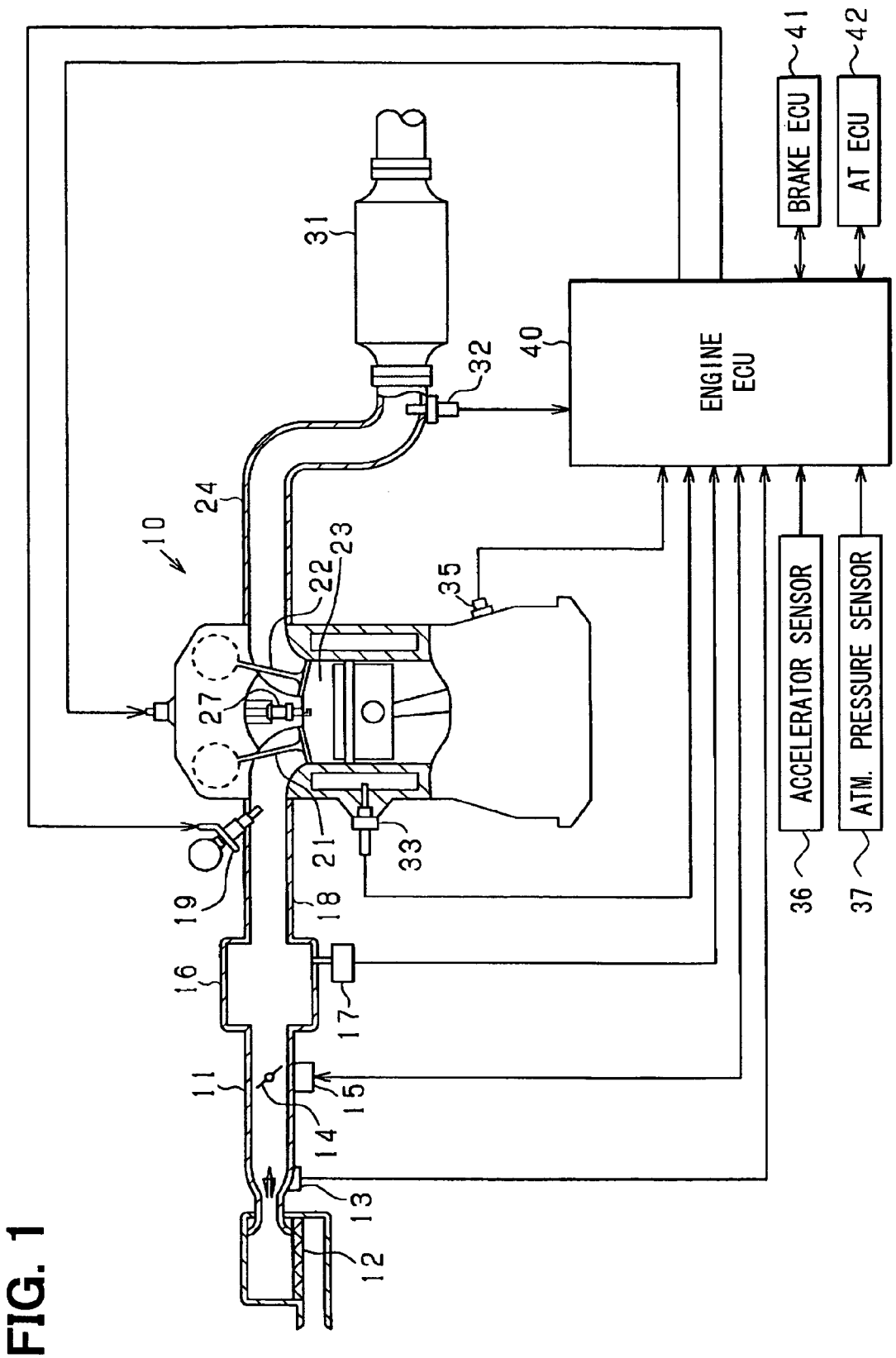
FIG. 1 is a structural diagram schematically showing an engine control system according to a first embodiment of the present invention.

In the engine 10 of FIG. 1, an air cleaner 12 is provided in an upstream end of an intake air pipe 11. An airflow meter 13 is provided on a downstream side of the air cleaner 12 to measure an intake air quantity (a throttle passing air quantity). A throttle valve 14 is provided on a downstream side of the airflow meter 13. An opening degree of the throttle valve 14 is adjusted by a throttle actuator 15, such as a DC motor. The opening degree (a throttle opening degree) of the throttle valve 14 is sensed by a throttle opening degree sensor, which is accommodated in the throttle actuator 15. A surge tank 16 is provided on a downstream side of the throttle valve 14, and an intake air pipe pressure sensor 17 is installed to the surge tank 16 to measure an intake air pipe pressure. An intake manifold 18 is connected to the surge tank 16 to supply air to each cylinder of the engine 10. Fuel injection valves 19 of a solenoid type are installed to the intake manifold 18 near intake ports of the cylinders to inject fuel into the cylinders.

Air intake valves 21 are provided to the air intake ports of the cylinders of the engine 10, and exhaust valves 22 are provided to exhaust ports of the cylinders. The mixture of air and fuel is supplied into a combustion chamber 23 of the respective cylinder thorough an opening operation of the corresponding air intake valve 21. Then, combusted exhaust gas is outputted from the combustion chamber 23 into an exhaust pipe 24 through an opening operation of the exhaust valve 22.

Spark plugs 27 are installed to a cylinder head of the engine 10 to correspond to the respective cylinders. At desired ignition timing, high voltage is applied to each corresponding spark plug 27 through an ignition apparatus (not shown), which includes an ignition coil. A spark is generated between opposed electrodes of each spark plug 27 through the application of the high voltage, so that the mixture gas (the mixture of air and fuel), which is supplied to the combustion chamber 23, is ignited and is combusted.

A catalytic converter (e.g., a three-way catalytic converter) 31 is provided in the exhaust pipe 24 to remove noxious components, such as CO, HC, NOx, contained in the exhaust gas. An air-fuel ratio sensor 32 (e.g., a linear A/F sensor, $O_2$ sensor) is arranged on an upstream side of the catalytic converter 31 to sense an air-fuel ratio of the exhaust gas. A coolant temperature sensor 33 and a crank angle sensor 35 are also provided to the cylinder block of the engine 10. The coolant temperature sensor 33 measures a temperature of engine coolant. The crank angle sensor 35 outputs a crank angle signal of a rectangular wave form at every predetermined crank angle (e.g., every 30 degree CA period) of the engine 10. Furthermore, the engine control system also includes an accelerator sensor 36 and an atmospheric pressure sensor 37. The accelerator sensor 36 senses an operational amount (an accelerator opening degree, i.e., an amount of depression) of an accelerator pedal, which is operated by a driver (an operator). The atmospheric pressure sensor 37 senses the atmospheric (ATM) pressure.

The engine ECU 40 includes a microcomputer as its main component, as is known in the art. The microcomputer includes, for example, a CPU, a ROM and a RAM. The engine ECU 40 executes control programs, which are stored in the ROM, to perform various control operations of the engine 10 according to an operational state of the engine. That is, measurement signals are supplied from the various sensors to the engine ECU 40. The engine ECU 40 computes, for example, a fuel injection quantity and ignition timing based on the supplied measurement signals to control fuel injection valves 19 and the ignition apparatus.

Furthermore, in the present embodiment, an electronic throttle control operation is performed through a torque based control operation. Here, the throttle opening degree is controlled to achieve a corresponding opening degree demand (a demanded opening degree) based on the torque generated in the engine 10. This will be briefly described. The engine ECU 40 computes a torque demand (a demanded torque) based on, for example, the accelerator opening degree, which is measured by the accelerator sensor 36. Then, the engine ECU 40 computes an air quantity demand (a demanded air quantity), which should be provided to achieve the torque demand. A throttle opening degree demand (a demanded throttle opening degree) is computed through use of the air quantity demand, which serves as a parameter. Then, the throttle actuator 15 is operated based on the throttle opening degree demand. In this way, the desired air quantity control operation is achieved, and the torque demand, which is demanded by the driver, can be achieved.

Furthermore, the vehicle also includes various in-vehicle devices or systems, such as a brake system and an automatic transmission. A brake ECU 41 and an automatic transmission (AT) ECU 42 are provided to control the brake system and the automatic transmission, respectively. The brake ECU 41 and the AT ECU 42 are connected to the engine ECU 40 in a manner that allows intercommunication therebetween. These ECU's 40 to 42 cooperate together to satisfy, i.e., to achieve the torque demand.

Figure 2:
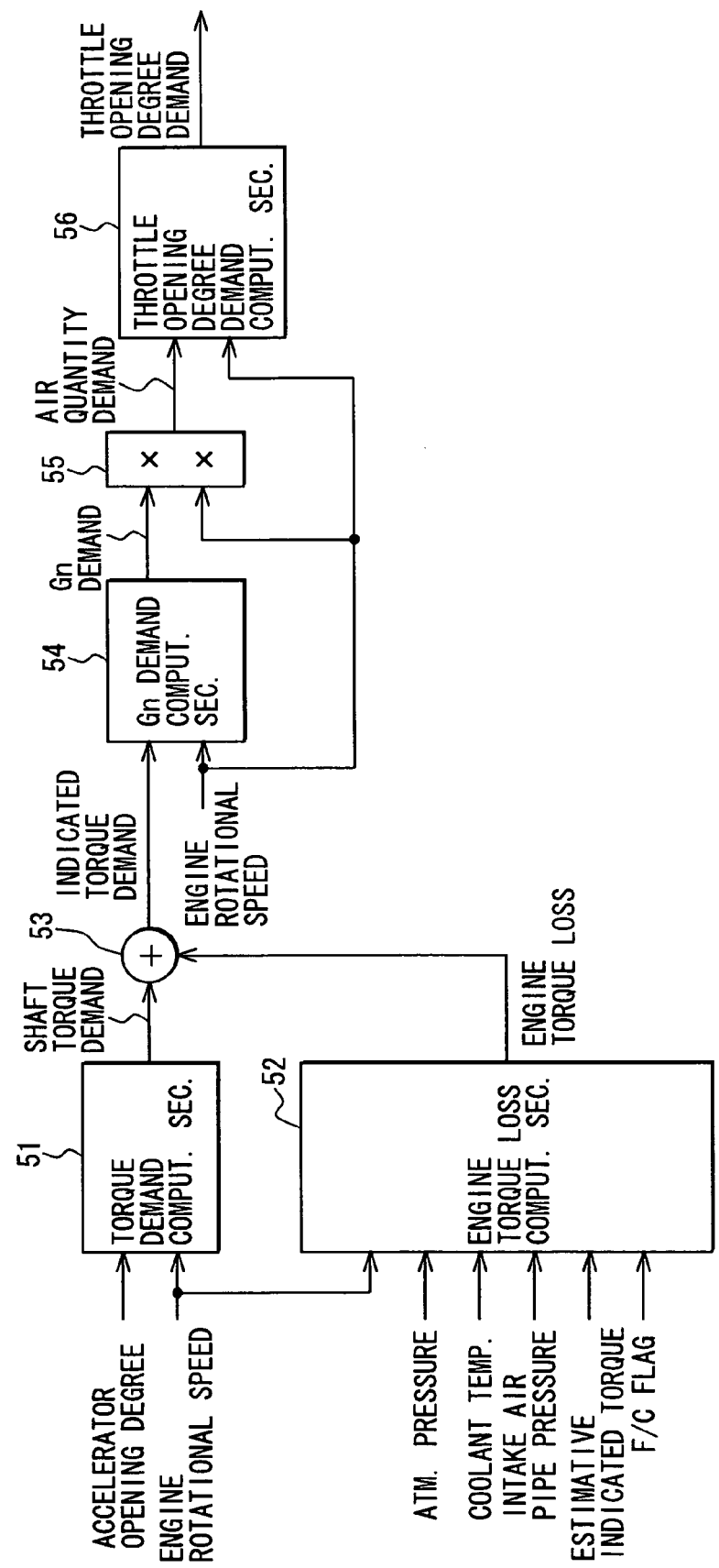
FIG. 2 is a block diagram, which indicates a functional logic for computing a throttle opening degree demand according to the first embodiment.

Next, the control operation, which is performed by the engine ECU 40, will be described. FIG. 2 shows a functional block diagram, which indicates a functional logic for computing the throttle opening degree demand.

Figure 4:
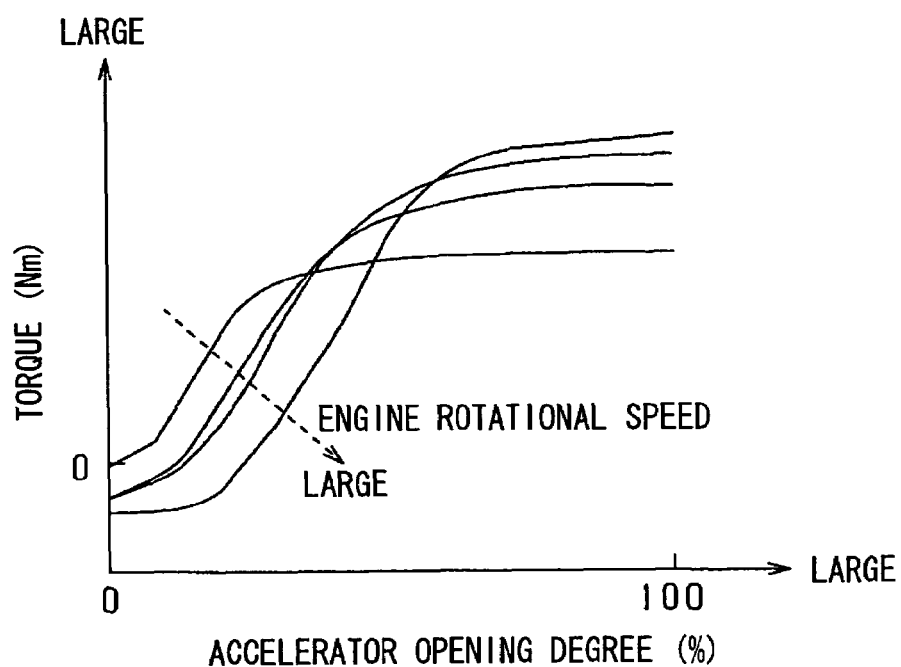
FIG. 4 is a diagram showing an accelerator opening degree—torque characteristic relationship according to the first embodiment.

In FIG. 2, a torque demand computing section 51 computes a shaft torque demand of the engine 10 based on the accelerator opening degree and the engine rotational speed. At this time, a relationship between the accelerator opening degree and the torque (the accelerator opening degree to torque characteristic) may be expressed based on the rotational speed of the engine 10 in a manner shown in FIG. 4, and the shaft torque demand may be computed based on the relationship of FIG. 4.

Furthermore, an engine torque loss computing section 52 computes an engine torque loss based on an engine rotational speed, atmospheric pressure, an engine coolant temperature, an intake air pipe pressure, an estimative indicated torque and an F/C flag. Details of this computation will be described latter. An estimative indicated torque of the engine may be computed by summing an estimative shaft torque and a previous value of the engine torque loss. Here, the estimative shaft torque is computed based on the engine rotational speed and an actual air quantity (an actual intake air quantity per rotation of the engine). An auxiliary device torque, which is required by, for example, an air conditioner compressor, an alternator and the like, may be added to the engine torque loss.

An adder section 53 computes an indicated torque demand by adding, i.e., summing the shaft torque demand, which is computed by the torque demand computing section 51, and the engine torque loss, which is computed by the engine torque loss computing section 52 (the indicated torque demand=the shaft torque demand+the engine torque loss).

Figure 5:
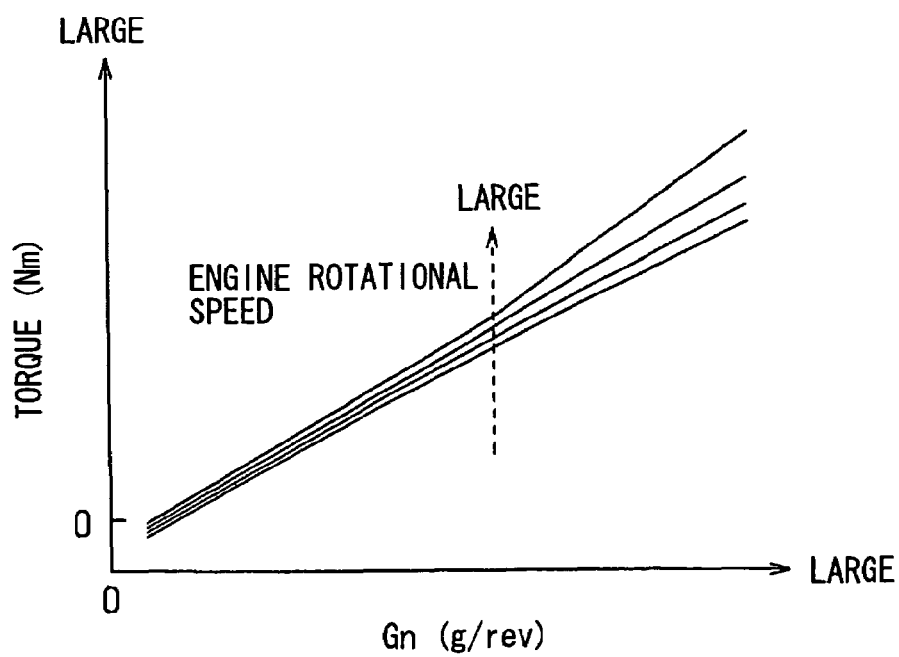
FIG. 5 is a diagram showing a Gn—torque characteristic relationship according to the first embodiment.

A Gn demand computing section 54 computes an air quantity demand, i.e., a demanded air quantity per revolution (g/rev) of the engine based on the indicated torque demand and the engine rotational speed. Hereinafter, the air quantity per revolution [g/rev] will be referred to as "Gn". At this time, a relationship (a Gn to torque characteristic) between the Gn [g/rev] and the torque can be expressed in a manner shown in FIG. 5 based on the engine rotational speed. The Gn demand is computed based on the relationship of FIG. 5.

An air quantity demand computing section 55 computes the air quantity demand per unit time [g/sec] by multiplying the Gn demand by the engine rotational speed.

Figure 6:
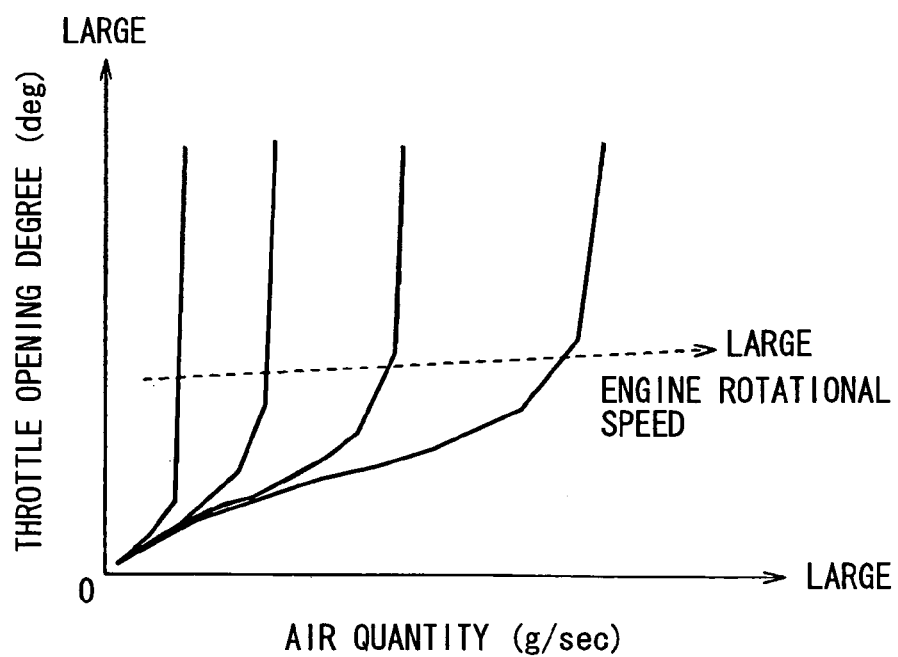
FIG. 6 is a diagram showing a throttle opening degree—air quantity characteristic relationship according to the first embodiment.

A throttle opening degree demand computing section 56 computes the throttle opening degree demand based on the air quantity demand and the engine rotational speed. At this time, a relationship (a throttle opening degree to air quantity characteristic) between the air quantity [g/sec] and the throttle opening degree may be expressed in a manner shown in FIG. 6 based on the engine rotational speed. The throttle opening degree demand may be computed based on the relationship of FIG. 6.

Next, the details of the engine torque loss computing section 52 will be described with reference to FIG. 3. The engine torque loss computing section 52 includes a pump loss computing section 61 and a frictional loss computing section 62, which compute a pump torque loss and a frictional torque loss, respectively, based on a torque loss characteristic in a normal combustion state of the engine.

Specifically, the pump loss computing section 61 computes the pump torque loss based on the engine rotational speed and an intake air pressure difference. The intake air pressure difference is obtained based on the atmospheric pressure and the intake air pipe pressure (the intake air pressure difference=the atmospheric pressure−the intake air pipe pressure). At this time, the pump loss characteristic can be expressed in a manner shown in FIG. 7 through use of the intake air pressure difference (the atmospheric pressure−the intake air pipe pressure) and the engine rotational speed, which serve as parameters. The pump torque loss is computed based on the relationship shown in FIG. 7.

Figure 8A:
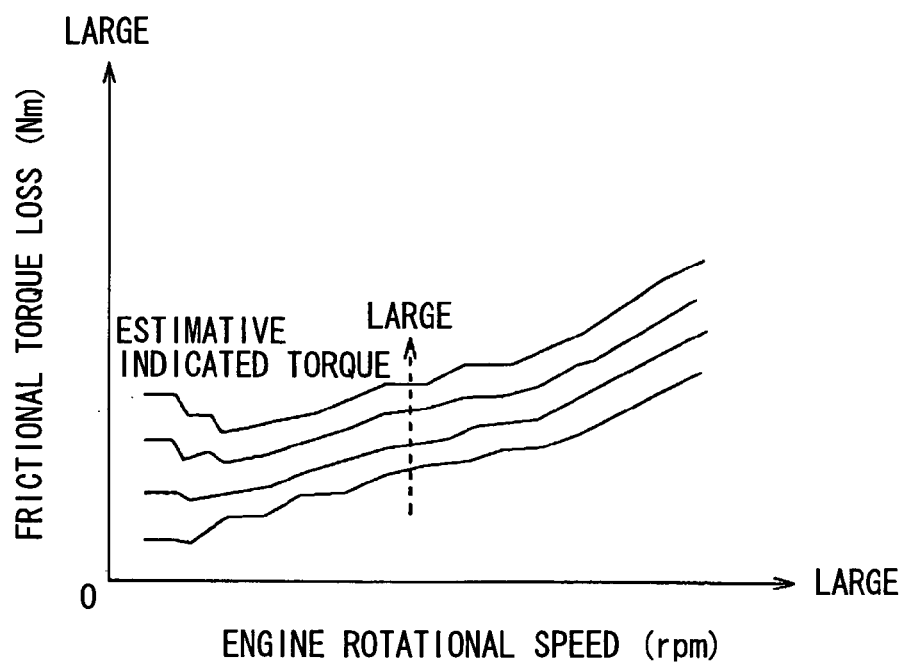
FIG. 8A is a diagram showing a frictional torque loss characteristic according to the first embodiment.
Figure 8B:
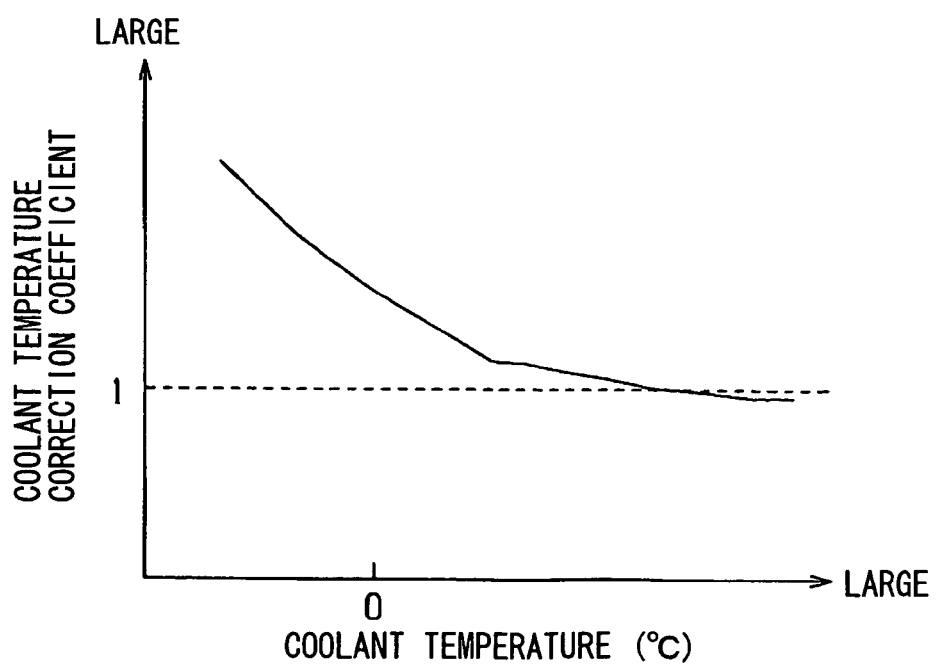
FIG. 8B is a diagram showing a relationship between a coolant temperature and a coolant temperature correction coefficient according to the first embodiment.

Furthermore, the frictional loss computing section 62 computes the frictional torque loss based on the engine rotational speed, the engine coolant temperature and the estimative indicated torque. At this time, the frictional loss characteristic can be expressed in a manner shown in FIG. 8A through use of the engine rotational speed and the estimative indicated torque, which serve as parameters. A base value of the frictional torque loss is computed based on the relationship of FIG. 8A. Furthermore, the coolant temperature correction is applied to the base vale of the frictional torque loss. Specifically, a coolant temperature correction coefficient is computed based on the relationship of FIG. 8B, and the frictional torque loss is computed by multiplying the base vale of the frictional torque loss by the coolant temperature correction coefficient.

The pump torque loss and the frictional torque loss are summed at an adder section 65 to compute the engine torque loss (uncorrected initial engine torque loss, which is the engine torque loss before the correction takes place).

Here, it should be noted that a difference in the engine torque loss exists between a combustion period (i.e., a firing period) of the engine and a combustion stop period (a motoring period) of the engine due to a difference in a cylinder temperature (a temperature inside the cylinder) and/or a cylinder pressure (a pressure inside the cylinder). Here, the combustion stop may occur due to, for example, fuel cut-off. Thus, in the present embodiment, in the fuel cut-off period, a difference in the torque loss between the combustion period and the combustion stop period is computed as a torque loss correction amount. The engine torque loss, which is computed based on the torque loss characteristic in the normal combustion state, is corrected by the torque loss correction amount.

That is, a torque loss correction amount computing section 63 computes the torque loss correction amount through use of the atmospheric pressure, the intake air pipe pressure, the engine rotational speed, the estimative indicated torque and the engine coolant temperature, which serve as parameters. At this time, the engine torque loss in the combustion period (a time period of performing combustion on all cylinders) is computed based on, for example, the map that is formed based on the torque loss characteristic in the combustion period. Also, the engine torque loss in the fuel cut-off period (a time period of deactivation of all of the cylinders, i.e., all-cylinder deactivation) is computed based on, for example, the map that is formed based on the torque loss characteristic in the fuel cut-off period. Then, a difference between the engine torque loss in the combustion period and the engine torque loss in the fuel cut-off period is computed, and this difference is used as the torque loss correction amount. In this way, the torque loss correction amount, which is required at the time of all-cylinder deactivation, is computed. However, it should be noted that the torque loss correction amount can be computed through computation, which uses the above respective parameters (the atmospheric pressure, the intake air pipe pressure, the engine rotational speed, the estimative indicated torque and the engine coolant temperature).

A correction amount changing section 64 changes the torque loss correction amount based on a result of determination of whether the fuel cut-off is currently executed. Specifically, it is determined whether the fuel cut-off is currently executed based on the F/C flag. When the F/C flag=ON (the fuel cut-off period), the subject torque loss correction amount is set to be the torque loss correction amount, which is computed in the torque loss correction amount computing section 63. In contrast, when the F/C flag=OFF (the normal combustion period), the subject torque loss correction amount is set to be zero. In this particular exemplary case, a condition (a fuel combustion stop condition) for executing the fuel cut-off is satisfied when the following conditions are all satisfied: (1) the engine rotational speed is equal to or greater than a predetermined threshold value (e.g., 2,000 rpm); and (2) the operational amount of the accelerator pedal is zero. When these two conditions (1) and (2) are both satisfied, the F/C flag is set to "ON".

Then, the torque loss correction amount is added to the uncorrected initial engine torque loss (the pump torque loss+the frictional torque loss) at an adder section 66 to compute the corrected engine torque loss.

Figure 9:
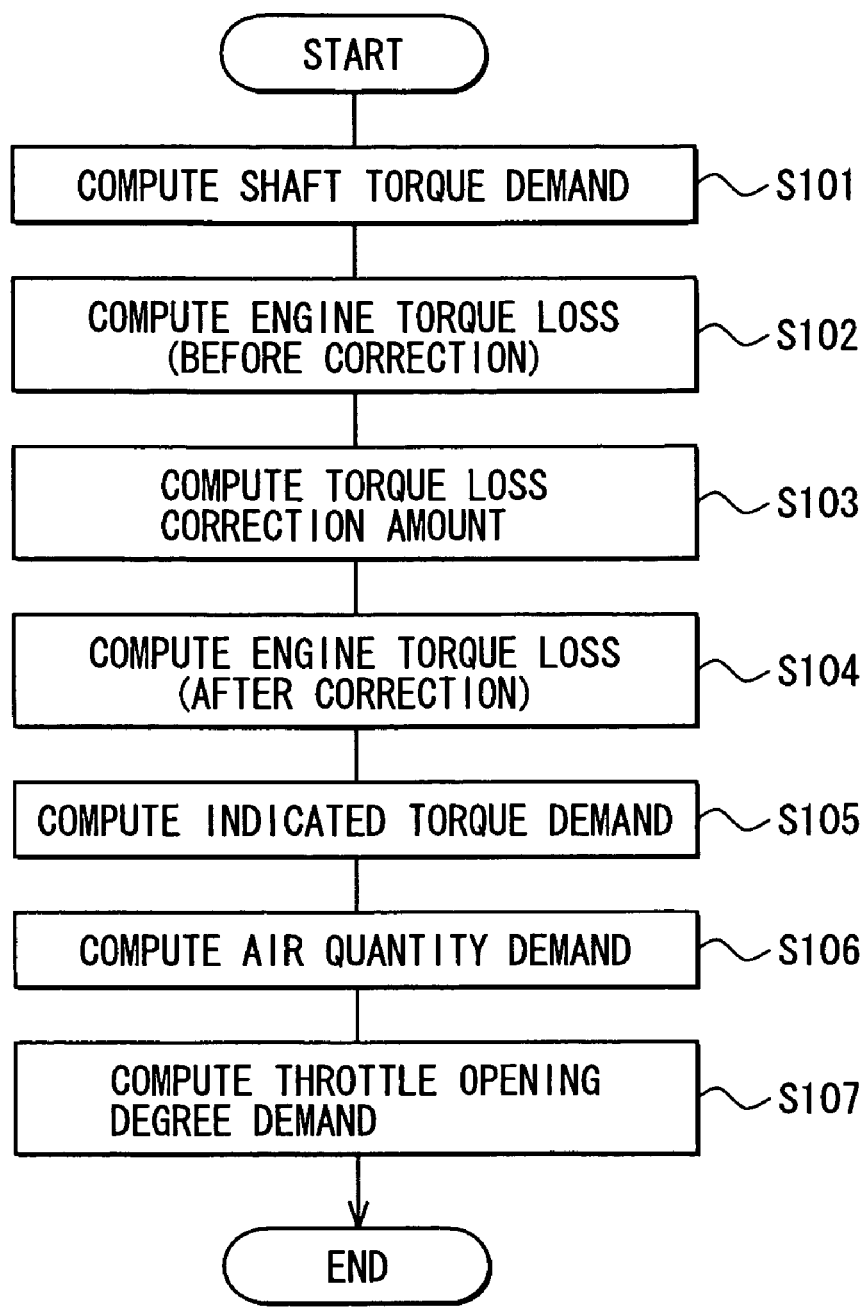
FIG. 9 is a flowchart showing a computation process for computing a throttle opening degree demand according to the first embodiment.

FIG. 9 is a flowchart showing a computation process for computing the throttle opening degree demand, and the engine ECU 40 executes this computation process at predetermined time intervals.

With reference to FIG. 9, at step S101, the shaft torque demand of the engine 10 is computed based on the accelerator opening degree and the engine rotational speed. At step S102, the uncorrected initial engine torque loss (the engine torque loss before the correction takes place) is computed based on the engine rotational speed, the atmospheric pressure, the intake air pipe pressure, the engine coolant temperature and the estimative indicated torque. At this time, as discussed with reference to FIG. 3, the pump torque loss and the frictional torque loss are computed. Then, the pump torque loss and the frictional torque loss are summed to obtain the uncorrected initial engine torque loss. This uncorrected initial engine torque loss corresponds to the engine torque loss, which occurs in the normal combustion period (a non fuel cut-off period).

At step S103, the torque loss correction amount, which is required in the fuel cut-off period, is computed. Here, when it is determined that the fuel cut-off is currently executed (F/C flag=ON), the torque loss correction amount is computed based on the atmospheric pressure, the intake air pipe pressure, the engine rotational speed, the estimative indicated torque and the engine coolant temperature, which serve as the parameters. In contrast, when it is determined that the normal combustion is executed (F/C flag=OFF), the torque loss correction amount is set to be zero.

At step S104, the uncorrected initial engine torque loss, which is computed at step S102, is corrected by the torque loss correction amount to obtain a corrected engine torque loss.

Thereafter, at step S105, the shaft torque demand and the corrected engine torque loss are summed to compute the indicated torque demand (the indicated torque demand=the shaft torque demand+the corrected engine torque loss). Then, at step S106, the air quantity demand is computed based on the indicated torque demand and the engine rotational speed. Thereafter, at step S107, the throttle opening degree demand is computed based on the air quantity demand and the engine rotational speed.

The present embodiment provides the following advantages.

The engine torque loss is corrected based on the result of determination of whether the fuel cut-off (the combustion stop) is currently executed. Thus, even in the fuel cut-off period (the combustion stop period), the engine torque loss can be computed at the level of accuracy, which is substantially the same as that of the normal combustion period. Accordingly, the engine torque loss can be relatively accurately computed regardless of the combustion state of the engine, and the torque generated from the engine can be relatively accurately controlled.

The torque loss correction amount is computed based on the difference between the engine torque loss, which is computed based on the torque loss characteristic in the combustion period, and the engine torque loss, which is computed based on the torque loss characteristic in the fuel cut-off period. Then, the engine torque loss is corrected based on the computed torque loss correction amount. As a result, the difference between the torque loss in the combustion period and the torque loss in the fuel cut-off period is appropriately reflected into the correction of the engine torque loss, so that the appropriate torque control can be achieved.

In the vehicle control system, which includes the ECU's 40–42 that control the engine 10, the brake system, the automatic transmission and the like, the torque control is performed with the relatively high accuracy, as discussed above. Therefore, there is implemented the torque control operation, which achieve the good cooperation among the engine and the other in-vehicle devices (systems). For example, at the time of decelerating the vehicle, the torque control operation, which is performed by the engine ECU 40, and the brake control operation, which is performed by the brake ECU 41, can be executed in the desirable manner to achieve the desirable deceleration and the like.

Second Embodiment

Next, a second embodiment will be described while focusing on differences between the second embodiment and the first embodiment. In the present embodiment, there is implemented a control operation, in which the number of cylinders, i.e., the quantity of cylinders under the fuel cut (hereinafter, referred to as "F/C cylinder quantity" or alternatively "combustion stop mode cylinder quantity") is variably set. That is, the engine is operated with the reduced number of cylinders, i.e., the reduced quantity of cylinders. Here, the correction of the engine torque loss is performed based on the F/C cylinder quantity. The F/C cylinder quantity may be computed according to a deviation between the estimative indicated torque and the indicated torque demand (=the estimative indicated torque−the indicated torque demand). Specifically, the F/C cylinder quantity is computed based on a quotient, which is obtained by dividing the torque deviation (=the estimative indicated torque−the indicated torque demand) by the estimative indicated torque. In this case, when the quotient, which is obtained by dividing the torque deviation by the estimative indicated torque, is increased, the F/C cylinder quantity is increased.

Figure 3:
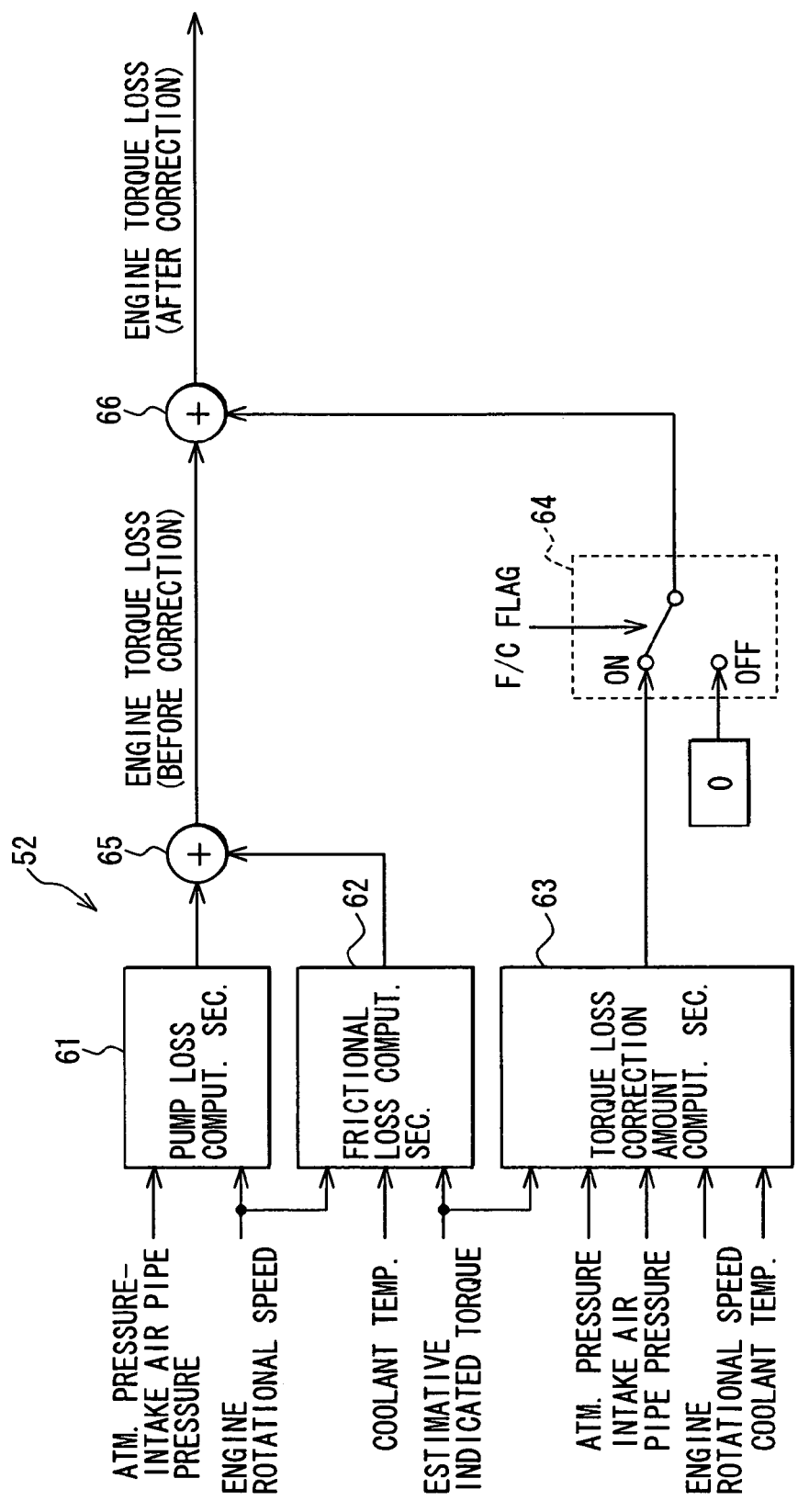
FIG. 3 is a block diagram showing details of an engine torque loss computing section according to the first embodiment.
Figure 10:
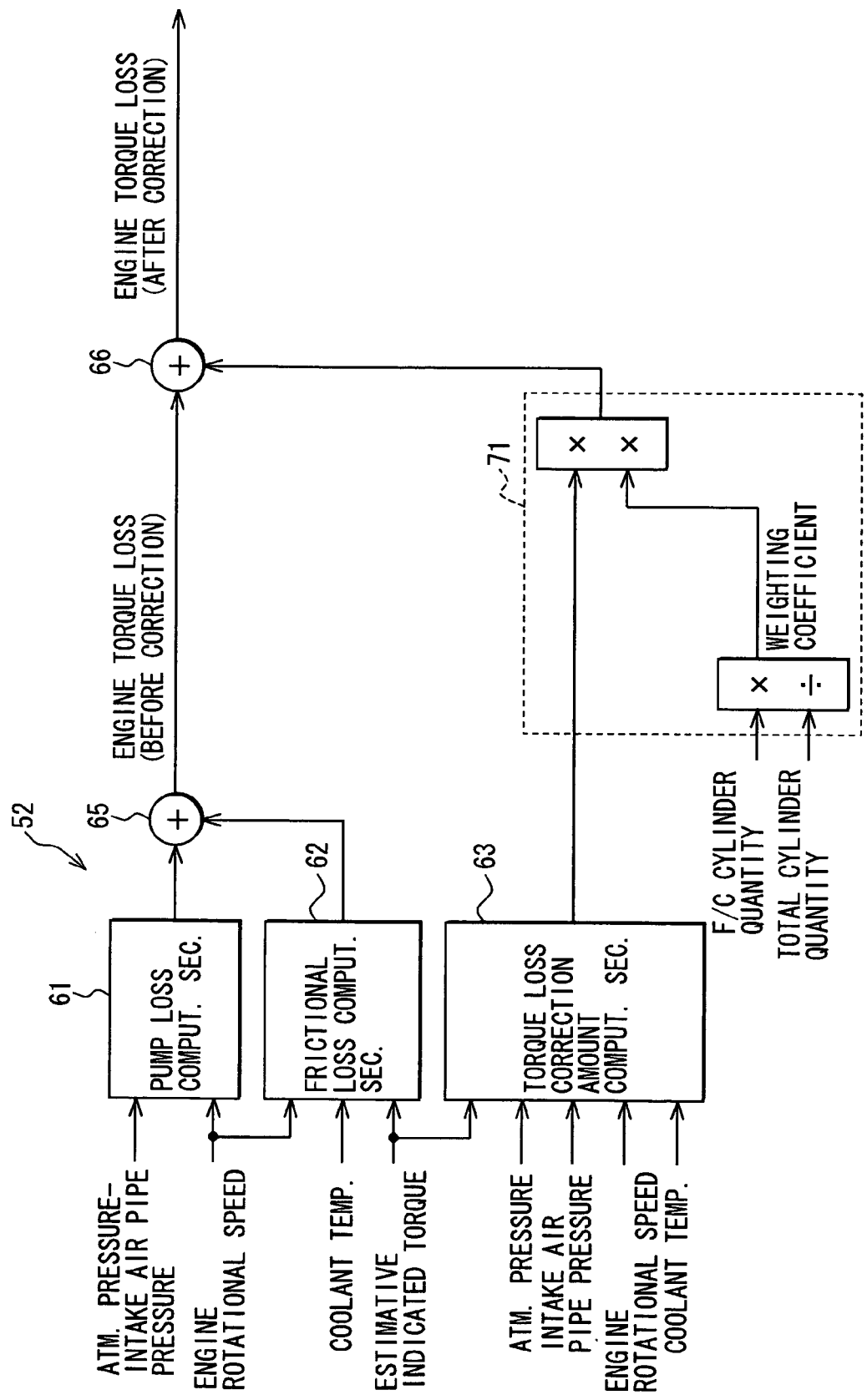
FIG. 10 is a block diagram showing details of an engine torque loss computing section according to a second embodiment.

FIG. 10 is a block diagram showing an engine torque loss computing section 52 according to the present embodiment and is produced by partially modifying that of FIG. 3. In FIG. 10, in place of the correction amount changing section 64 of FIG. 3, a correction amount weight setting section 71 is provided.

That is, in the correction amount weight setting section 71, a quotient, which is obtained by dividing the current F/C cylinder quantity by the total quantity of the cylinders, i.e., the total cylinder quantity, is computed as a weighting coefficient (the weighting coefficient=F/C cylinder quantity divided by the total quantity of the cylinders). Then, the torque loss correction amount, which is computed in the torque loss correction amount computing section 63, is multiplied by the weighting coefficient to obtain a final torque loss correction amount, i.e., a conclusive torque loss correction amount. In the normal combustion period, the F/C cylinder quantity is zero, and thereby the conclusive torque loss correction amount is set to be zero. Then, the conclusive torque loss correction amount is added to the uncorrected initial engine torque loss at the adder section 66 to obtain the corrected engine torque loss.

Figure 11:
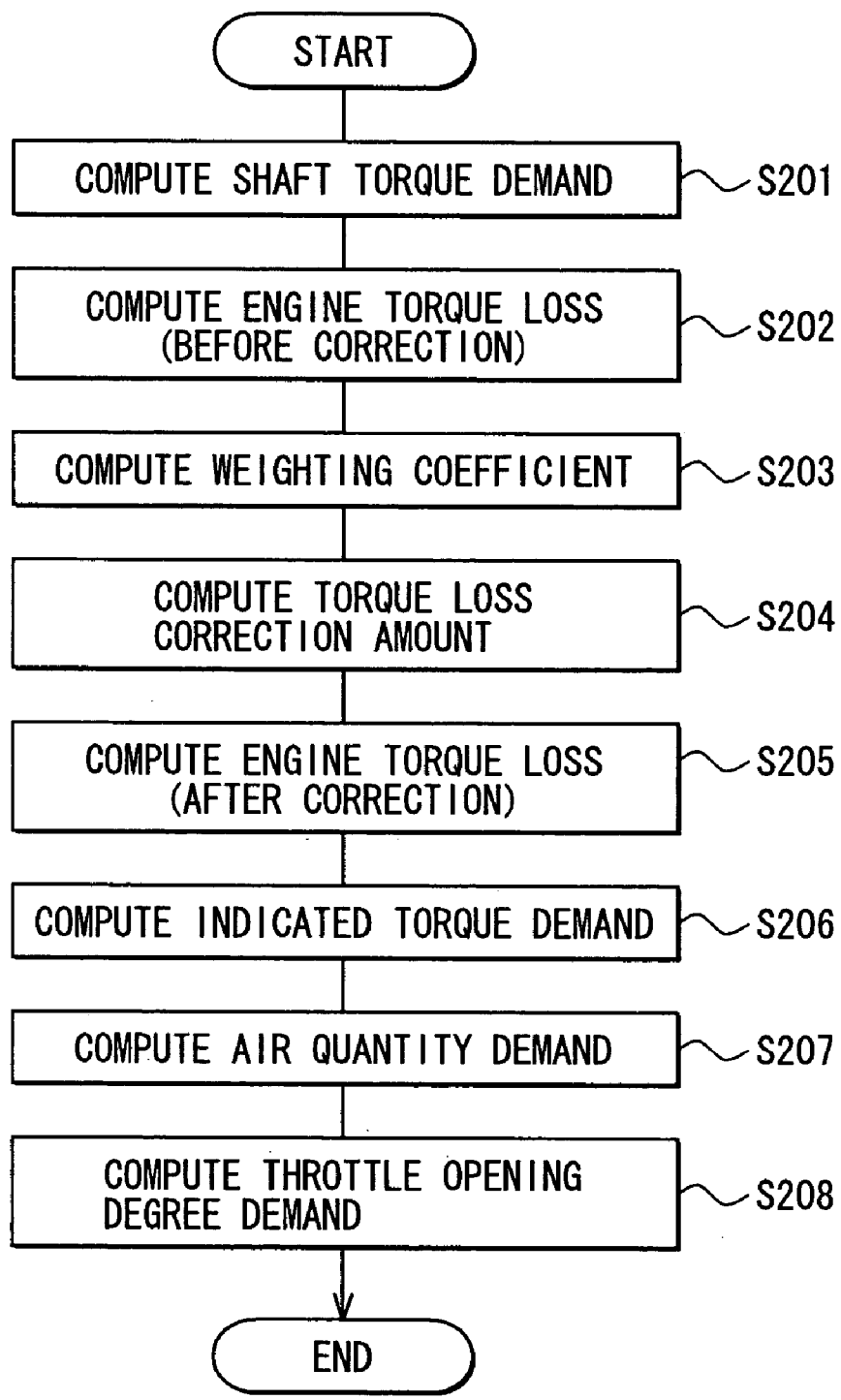
FIG. 11 is a block diagram showing details of a computation process for computing a throttle opening degree demand according to the second embodiment.

FIG. 11 is a flowchart showing a computation process for computing the throttle opening degree demand. In place of the process shown in FIG. 9, this process is executed by the engine ECU 40. In FIG. 11, the substantial differences, which differ from the process of FIG. 9, are steps S203, S204, and the rest of the process shown in FIG. 11 is similar to that of FIG. 9.

In the process of FIG. 11, the shaft torque demand and the uncorrected initial engine torque loss are computed (steps S201, S202). Next, at step S203, the weighting coefficient is computed based on the F/C cylinder quantity and the total quantity of the cylinders (i.e., the weighting coefficient=F/C cylinder quantity divided by the total quantity of the cylinders). Then, at the next step S204, the conclusive torque loss correction amount is computed by multiplying the torque loss correction amount (the correction amount at the time of all-cylinder deactivation), which is required in the fuel cut-off period, by the weighting coefficient.

Thereafter, similar to those of FIG. 9, the corrected engine torque loss, the indicated torque demand, the air quantity demand and the throttle opening degree demand are respectively computed (steps S205 to S208).

According to the second embodiment, the engine is controlled to operate with the reduced quantity of cylinders, and the engine torque loss can be appropriately computed based on the quantity of the reduced cylinders, so that the controllability of the engine torque is improved.

Third Embodiment

Next, a third embodiment will be described while focusing on differences between the third embodiment and the first embodiment. In the present embodiment, the engine torque loss in the combustion period and the engine torque loss in the fuel cut-off period are individually computed, and one of these torque losses is selectively used to compute the current engine torque loss.

Figure 12:
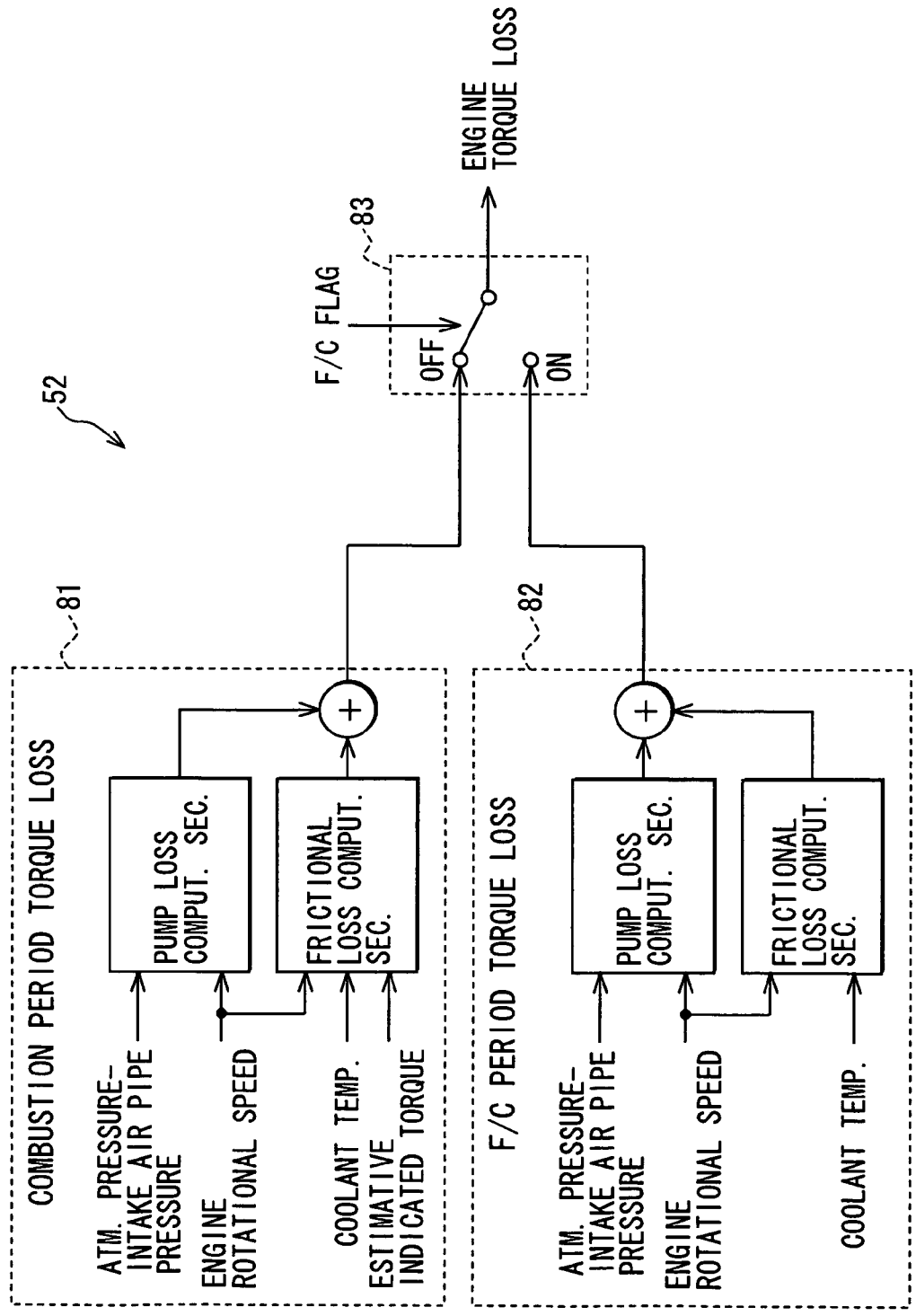
FIG. 12 is a block diagram showing details of an engine torque loss computing section according to a third embodiment.

FIG. 12 is a block diagram showing an engine torque loss computing section 52 of the present embodiment. In the structure shown in FIG. 12, a first torque loss computing section 81 for computing the engine torque loss in the combustion period and a second torque loss computing section 82 for computing the engine torque loss in the fuel cut-off period are provided.

Figure 7:
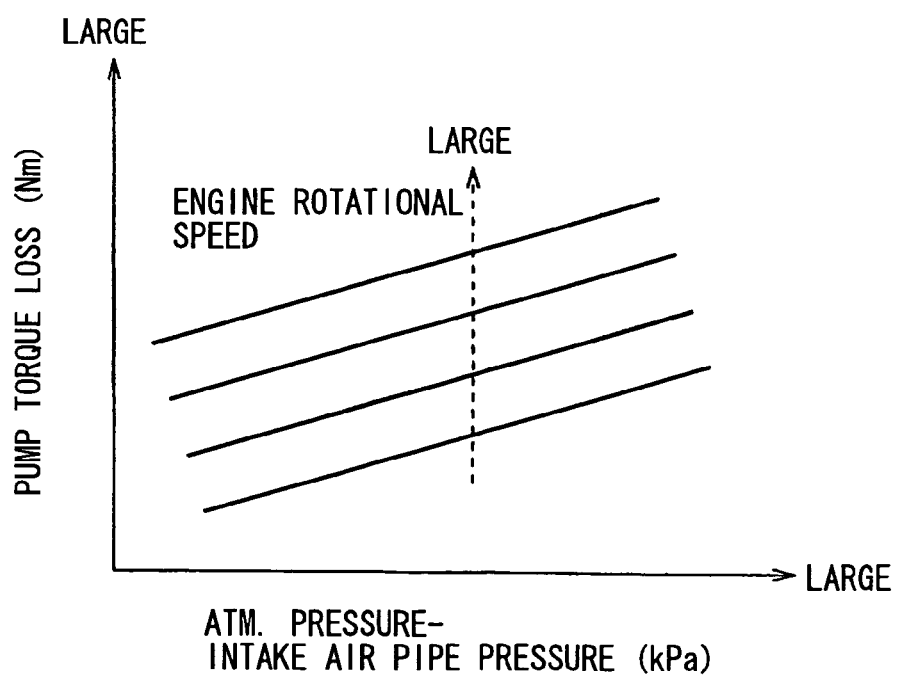
FIG. 7 is a diagram showing a pump loss characteristic according to the first embodiment.
Figure 13A:
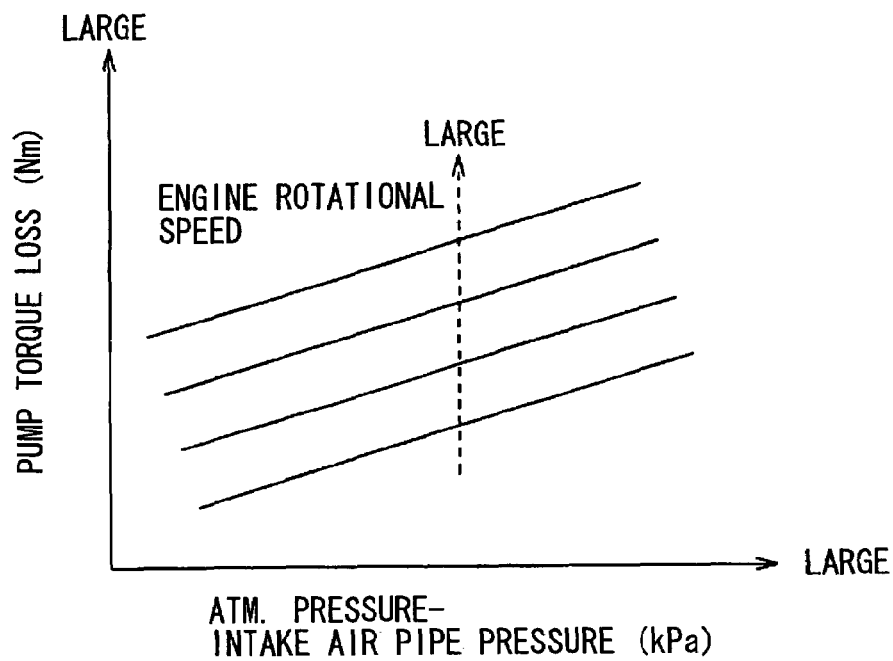
FIG. 13A is a diagram showing a pump loss characteristic in a combustion period according to the third embodiment.
Figure 13B:
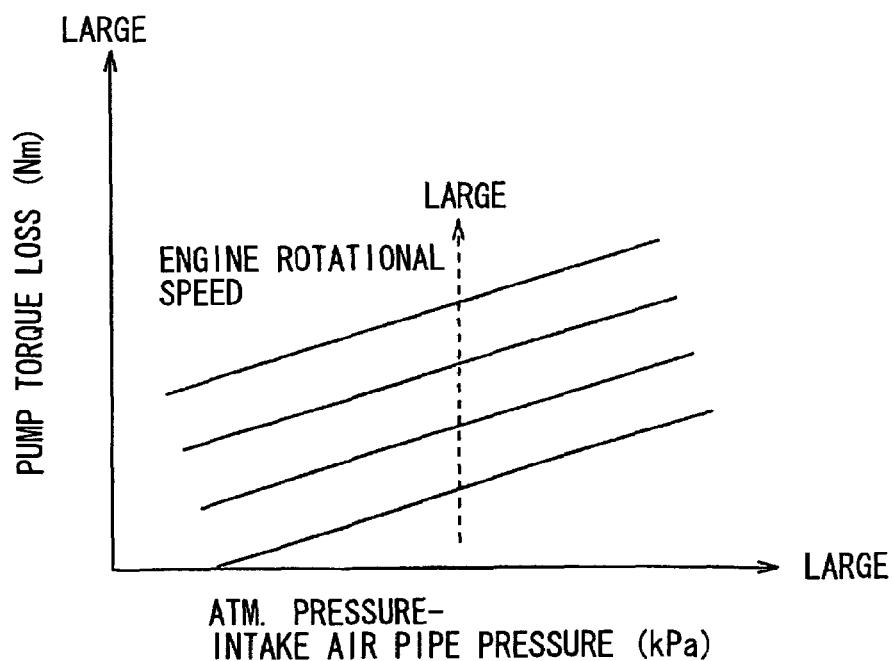
FIG. 13B is a diagram showing a pump loss characteristic in a fuel cut-off period according to the third embodiment.
Figure 14A:
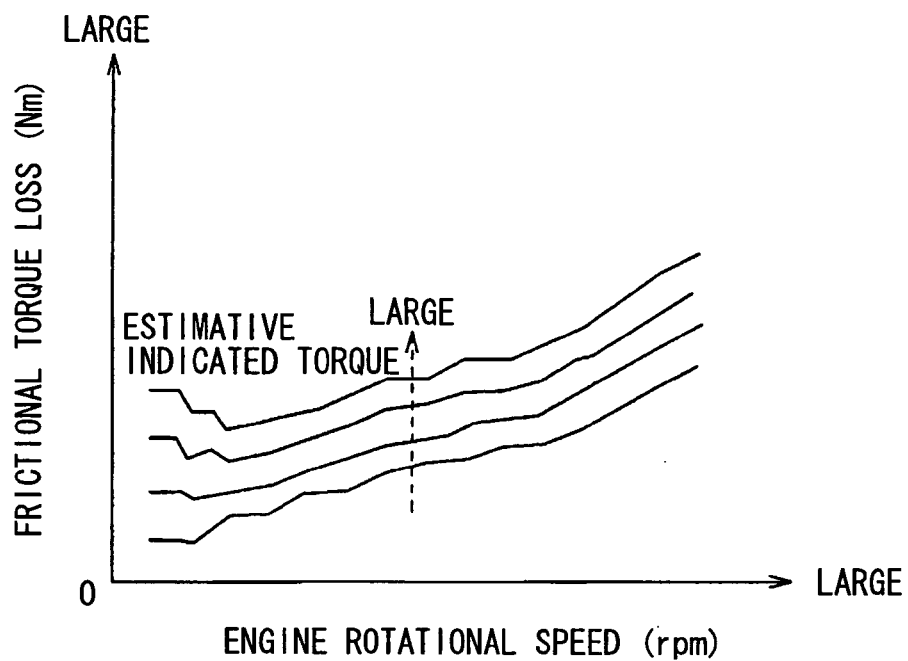
FIG. 14A is a diagram showing a frictional loss characteristic in the combustion period according to the third embodiment.
Figure 14B:
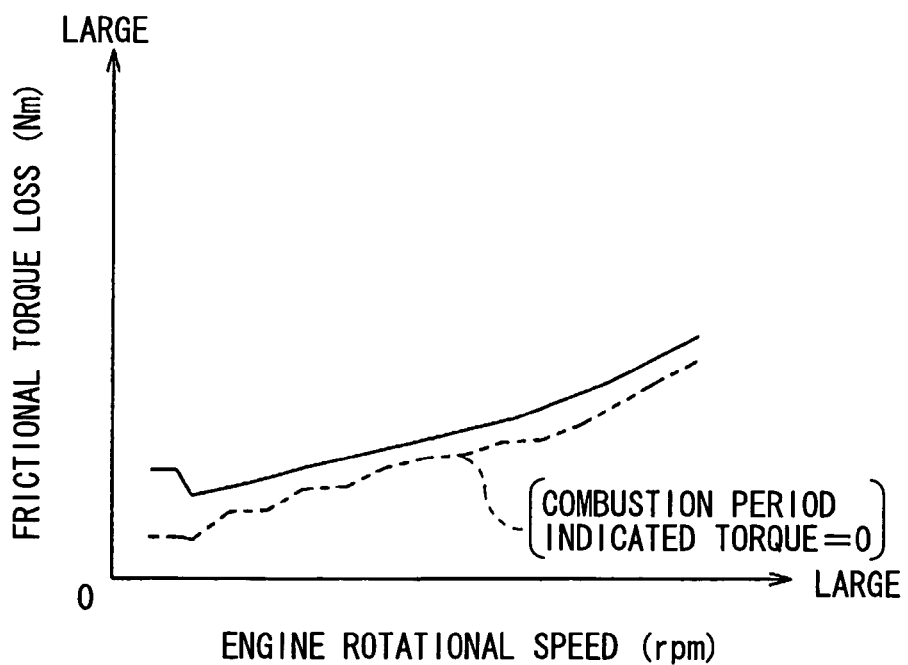
FIG. 14B is a diagram showing a frictional loss characteristic in the fuel cut-off period according to the third embodiment.

Here, the first torque loss computing section 81 and the second torque loss computing section 82 respectively use different characteristics to compute the pump torque loss and the frictional torque loss. FIG. 13A shows the pump loss characteristic in the combustion period, and FIG. 13B shows the pump loss characteristic in the fuel cut-off period. Furthermore, FIG. 14A shows the frictional loss characteristic in the combustion period, and FIG. 14B shows the frictional loss characteristic in the fuel cut-off period. It should be noted that FIG. 13A shows the same characteristic as that of FIG. 7, and FIG. 14A shows the same characteristic as that of FIG. 8A.

Upon comparison between the pump loss characteristic in the combustion period and the pump loss characteristic in the fuel cut-off period, it should be understood that the pump torque loss in the fuel cut-off period is smaller that the pump torque loss in the combustion period, as shown in FIGS. 13A and 13B.

Furthermore, in the fuel cut-off period, the estimative indicated torque of the engine is zero. Therefore, there is defined only a single characteristic line (a solid line) in FIG. 14B. In this case, a characteristic line (a dotted line in FIG. 14B), which is obtained by setting the estimative indicated torque to be zero in the frictional loss characteristic in the combustion period, may possibly be used as the frictional loss characteristic in the fuel cut-off period. However, in reality, an increase in the frictional torque loss, which corresponds to a decrease in the cylinder temperature, is expected in the fuel cut-off period. Therefore, in the case of FIG. 14B, the frictional torque loss is slightly increased relative to the characteristic line (the dotted line in FIG. 14B), which is obtained by setting the estimative indicated torque to be zero in the combustion period.

The first torque loss computing section 81 uses the relationship of FIG. 13A and computes the pump torque loss based on the intake air pressure difference (the atmospheric pressure–the intake air pipe pressure) and the engine rotational speed. Furthermore, the first torque loss computing section 81 uses the relationship of FIG. 14A and computes the frictional torque loss based on the engine rotational speed, the engine coolant temperature and the estimative indicated torque. Here, the correction of the frictional torque loss is similar to the one discussed above. The pump torque loss and the frictional torque loss are summed to compute the engine torque loss in the combustion period.

The second torque loss computing section 82 uses the relationship of FIG. 13B and computes the pump torque loss based on the intake air pressure difference (the atmospheric pressure–the intake air pipe pressure) and the engine rotational speed. Furthermore, the second torque loss computing section 82 uses the relationship of FIG. 14B and computes the frictional torque loss based on the engine rotational speed and the engine coolant temperature. The correction of the frictional torque loss based on the coolant temperature is similar to the one discussed above. The pump torque loss and the frictional torque loss are summed to compute the engine torque loss in the fuel cut-off period.

A torque loss changing section 83 changes the engine torque loss based on a result of determination of whether the fuel cut-off is currently executed. Specifically, it is determined whether the fuel cut-off is currently executed based on the F/C flag. When the F/C flag is OFF (i.e., in the combustion period), the engine torque loss, which is computed in the first torque loss computing section 81, is used as a final engine torque loss, i.e., a conclusive engine torque loss. When the F/C flag is ON (i.e., the combustion stop period), the engine torque loss, which is computed by the second torque loss computing section 82, is used as the conclusive engine torque loss.

Figure 15:
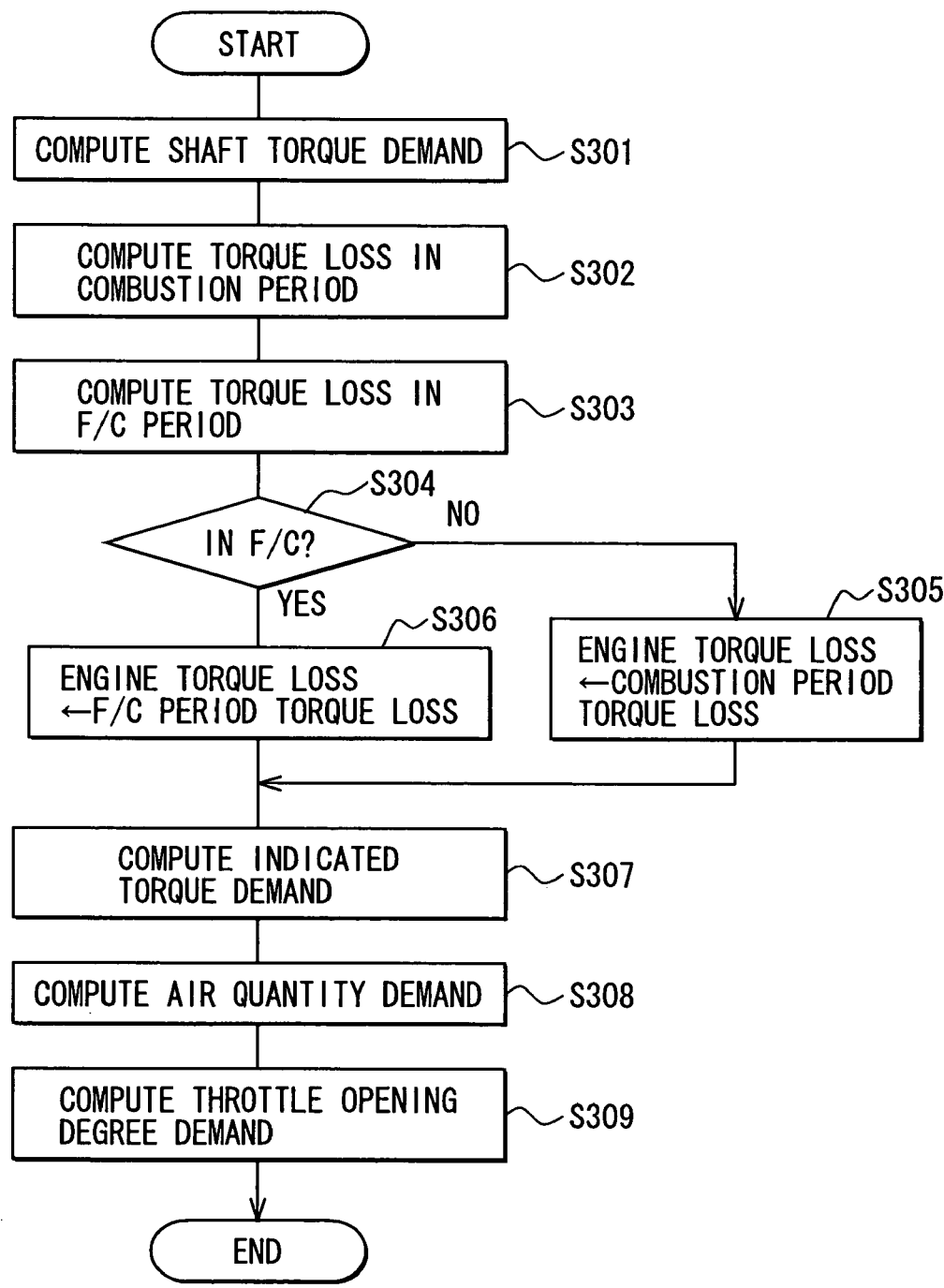
FIG. 15 is a flowchart showing details of a computation process for computing a throttle opening degree demand according to the third embodiment.

FIG. 15 is a flowchart showing a computation process for computing the throttle opening degree demand. In place of the process shown in FIG. 9, this process is executed by the engine ECU 40. In FIG. 15, the substantial differences, which differ from the process of FIG. 9, are steps S303 to S306, and the rest of the process shown in FIG. 15 is similar to that of FIG. 9.

In the process of FIG. 15, the shaft torque demand is computed first (step S301), and then the engine torque loss is computed based on the torque loss characteristic in the combustion period, and the engine torque loss is computed based on the torque loss characteristic in the fuel cut-off period (steps S302, S303). Thereafter, at step S304, it is determined whether the fuel cut-off (F/C) is currently executed. When it is determined that the fuel cut-off is not currently executed, control proceeds to step S305. At step S305, the engine torque loss in the combustion period (the computed value of step S302) is used as the conclusive engine torque loss. In contrast, when it is determined that the fuel cut is currently executed at step S304, control proceeds to step S306. At step S306, the engine torque loss in the fuel cut-off period (the computed value of step S303) is used as the conclusive engine torque loss.

Thereafter, similar to those of FIG. 9, the indicated torque demand, the air quantity demand and the throttle opening degree demand are respectively computed (steps S307 to S309).

According to the third embodiment, one of the engine torque loss, which is computed based on the torque loss characteristic in the combustion period, and the engine torque loss, which is computed based on the torque loss characteristic in the fuel cut-off period, is selected as the conclusive engine torque loss based on the result of determination of whether the fuel cut-off is currently executed. Thus, in each of the combustion state (the combustion mode) and the fuel cut-off state (the fuel cut-off mode), the engine torque loss can be relatively accurately computed. Accordingly, the engine torque loss can be relatively accurately computed regardless of the operational state of the engine, and the generated torque of the engine can be relatively accurately controlled.

Fourth Embodiment

Next, a fourth embodiment will be described while focusing on differences between the fourth embodiment and the above respective embodiments. In the present embodiment, similar to the third embodiment, the engine torque loss is computed based on the torque loss characteristic in the combustion period, and the engine torque loss is computed based on the torque loss characteristic in the fuel cut-off period. Here, the conclusive engine torque loss is computed based on a ratio between the F/C cylinder quantity and a combustion mode cylinder quantity (i.e., a total number of cylinders under the fuel combustion mode).

Figure 16:
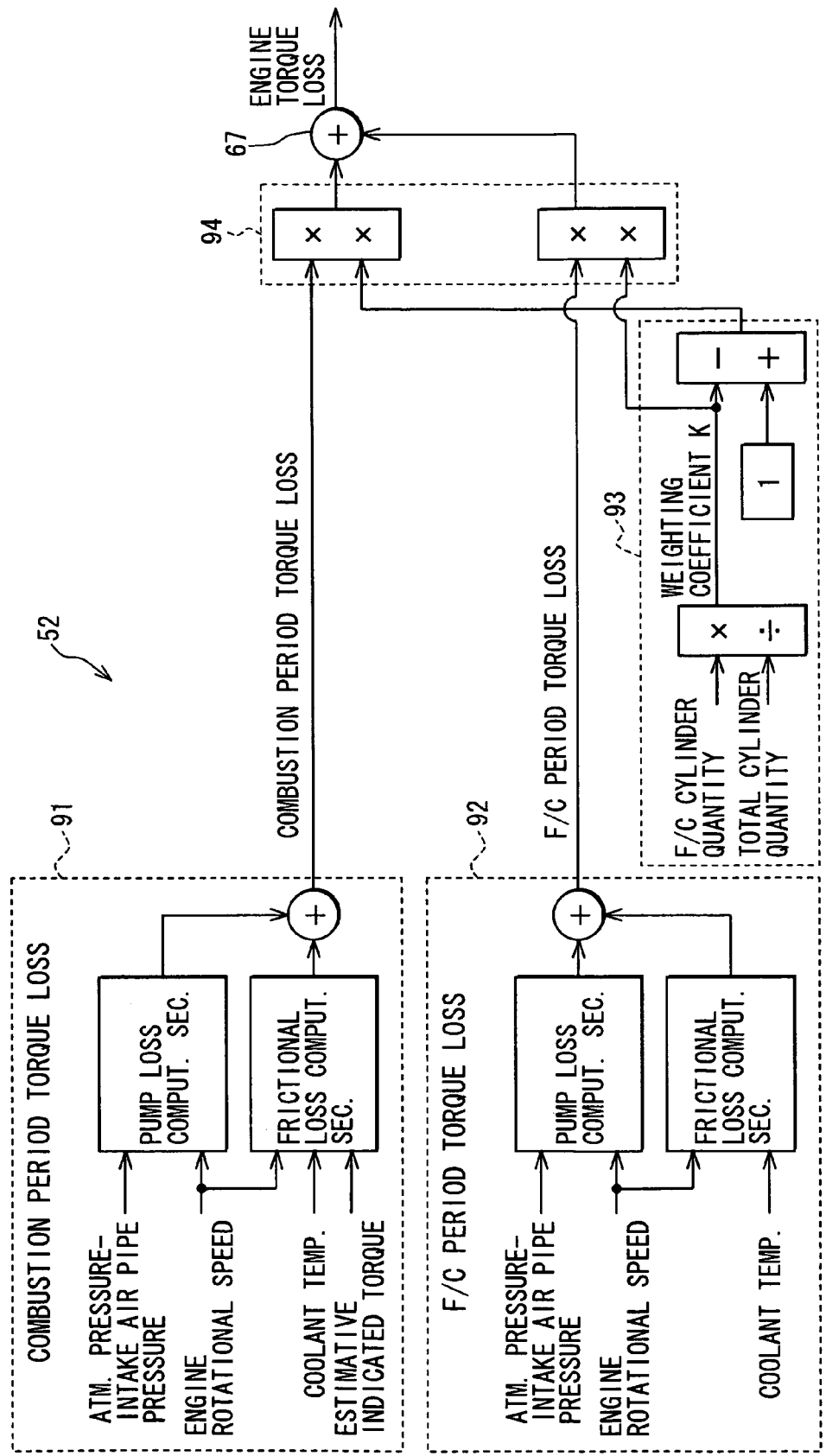
FIG. 16 is a block diagram showing details of an engine torque loss computing section according to a fourth embodiment.

FIG. 16 is a block diagram showing an engine torque loss computing section 52 of the present embodiment. In the structure shown in FIG. 16, a first torque loss computing section 91 for computing the engine torque loss in the combustion period and a second torque loss computing section 91 for computing the engine torque loss in the fuel cut-off period are provided. The first torque loss computing section 91 and the second torque loss computing section 92 of FIG. 16 are similar to the first torque loss computing section 81 and the second torque loss computing section 82 described with reference to FIG. 12.

That is, the first torque loss computing section 91 computes the pump torque loss and the frictional torque loss through use of the relationships shown in FIGS. 13A and 14A. Then, the first torque loss computing section 91 sums the pump torque loss and the frictional torque loss to compute the engine torque loss in the combustion period. Furthermore, the second torque loss computing section 92 computes the pump torque loss and the frictional torque loss through use of the relationships shown in FIGS. 13B and 14B. Then, the second torque loss computing section 92 sums the pump torque loss and the frictional torque loss to compute the engine torque loss in the fuel cut-off period.

A weighting coefficient computing section 93 computes a weighting coefficient K by dividing the current F/C cylinder quantity by the total quantity of the cylinders (i.e., =the F/C cylinder quantity divided by the total quantity of the cylinders). The weighting coefficient computing section 93 further computes a value of "1—the weighting coefficient". At this time, the weighting coefficient K is a ratio of the combustion stop mode cylinder quantity (i.e., the number of deactivated cylinders, that is, the quantity of deactivated cylinders that are under the combustion stop mode or the F/C mode) relative to the total quantity of cylinders and corresponds to "a second weighting coefficient." Furthermore, the value of "1—the weighting coefficient K" is a ratio of the combustion mode cylinder quantity relative to the total quantity of the cylinders (=the combustion mode cylinder quantity divided by the total quantity of the cylinders) and corresponds to "the first weighting coefficient."

The weighting section 94 weights the engine torque loss in the combustion period with the value of "1—the weighting coefficient K", and the weighting section 94 weights the engine torque loss in the fuel cut-off period with the weighting coefficient K. The terms computed at this time correspond to a first torque loss term and a second torque loss term, respectively. The conclusive engine torque loss is computed at an adder section 67 by summing the engine torque loss in the combustion period and the engine torque loss in the fuel cut-off period, which are weighted by the weighting section 94.

Figure 17:
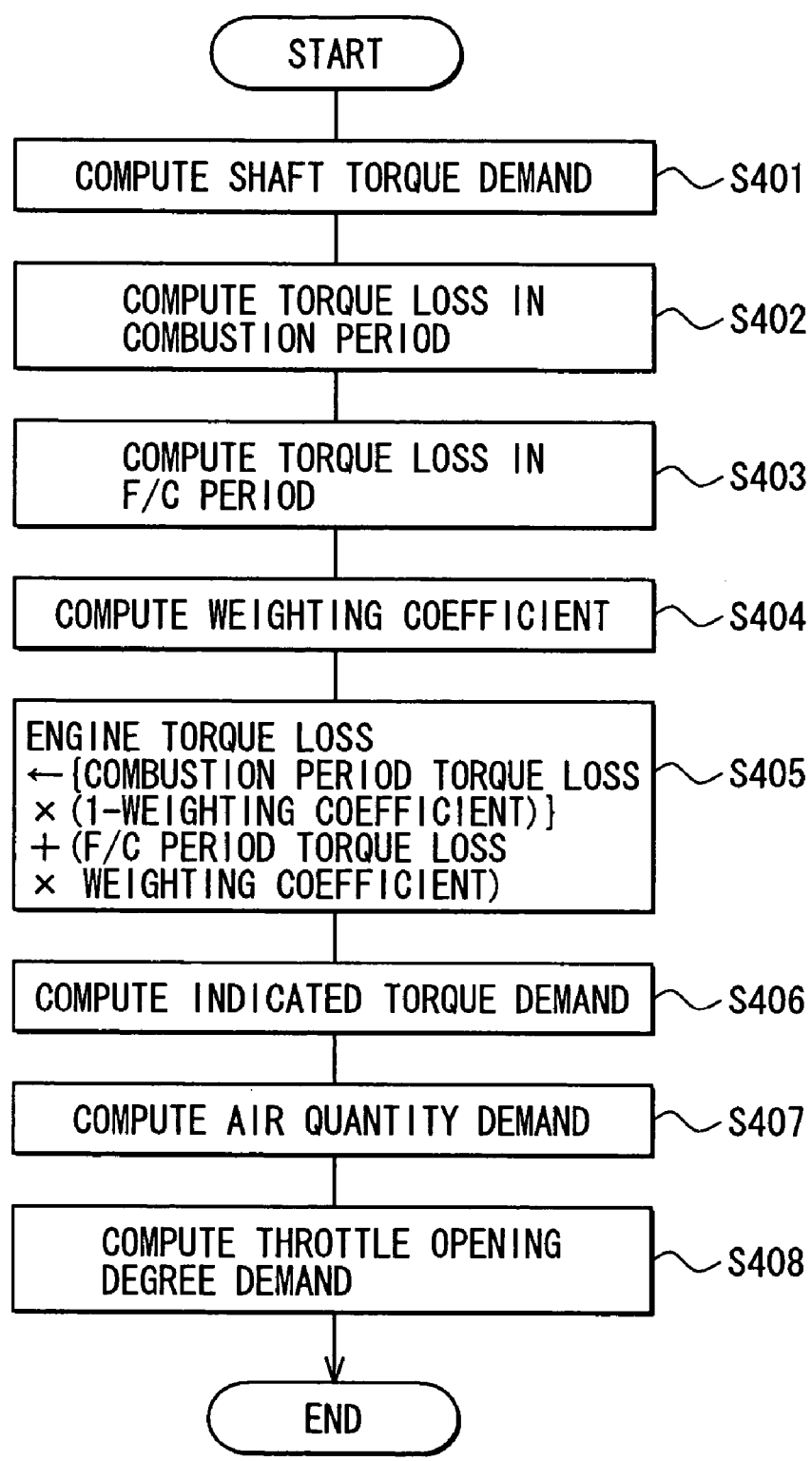
FIG. 17 is a flowchart showing details of a computation process for computing a throttle opening degree demand according to the fourth embodiment.

FIG. 17 is a flowchart showing a computation process for computing the throttle opening degree demand. In place of the process shown in FIG. 9, this process is executed by the engine ECU 40. In FIG. 17, the substantial differences, which differ from the process of FIG. 15, are steps S404, S405, and the rest of the process shown in FIG. 17 is similar to that of FIG. 15.

In the process of FIG. 17, the shaft torque demand is computed first (step S401), and then the engine torque loss is computed based on the torque loss characteristic in the combustion period, and the engine torque loss is computed based on the torque loss characteristic in the fuel cut-off period (steps S402, S403). Thereafter, the weighting coefficient is computed based on the F/C cylinder quantity and the total quantity of the cylinders (the weighting coefficient=F/C cylinder quantity divided by the total quantity of the cylinders), and the conclusive engine torque loss is computed based on this weighting coefficient, the engine torque loss in the combustion period and the engine torque loss in the fuel cut-off period (steps S404, 5405).

Thereafter, the indicated torque demand, the air quantity demand and the throttle opening degree demand are respectively computed (steps S406 to S408).

According to the fourth embodiment, the engine is controlled to operate with the reduced quantity of cylinders, and the conclusive engine torque loss is determined by reflecting the ratio between the combustion cylinder quantity and the F/C cylinder quantity. Thus, the engine torque loss can be appropriately computed at the time of engine operation with the reduced quantity of cylinders, and the controllability of the engine torque is improved.

The conclusive engine torque loss is computed by weighting the engine torque loss in the combustion period and the engine torque loss in the fuel cut-off period according to the combustion mode cylinder quantity and the F/C cylinder quantity at each time. Thus, in the case were the combustion mode cylinder quantity and the F/C cylinder quantity respectively change with time, the engine torque loss can be appropriately computed.

The present invention is not limited to the above embodiments. For example, the above embodiments can be modified as follows.

In the first embodiment, as shown in FIG. 3, the corrected engine torque loss is computed by adding the torque loss correction amount to the uncorrected initial engine torque loss. However, this may be modified. Specifically, the corrected engine torque loss may be computed by multiplying the uncorrected initial engine torque loss by a torque loss correction coefficient. However, in this case, a pump torque loss correction coefficient f1 and a frictional torque loss correction coefficient f2 may be individually computed as torque loss correction coefficients. Then, a value of "the pump torque loss×the correction coefficient f1" and a value of "the frictional torque loss×the correction coefficient f2" may be summed to compute the corrected engine torque loss.

In the above embodiment, the torque loss correction amount is computed based on the difference between the torque loss, which is computed based on the torque loss characteristic in the combustion period, and the torque loss, which is computed based on the torque loss characteristic in the combustion stop period. Alternatively, the torque loss differences may be stored in a form of a map, and the torque loss correction amount may be directly computed from this map.

For example, in the third embodiment, at each time, the engine torque loss is computed based on the torque loss characteristic in the combustion period, and also the engine torque loss is computed based on the torque loss characteristic in the combustion stop period. Alternatively, when it is determined that the fuel cut-off is not currently performed, the engine torque loss may be solely computed based on the torque loss characteristic in the combustion period. Also, when it is determined that the fuel cut-off is currently performed, the engine torque loss may be solely computed based on the torque loss characteristic in the fuel cut-off period.

In the above embodiment, the fuel cut-off for stopping the fuel combustion is executed. Alternatively, any other suitable measure may be taken to stop the fuel combustion. For example, in addition to or in place of the fuel cut-off, ignition cut-off may be executed to stop the fuel combustion.

In the above embodiment, the torque demand, which is demanded by the driver, is computed based on the accelerator opening degree and the engine rotational speed. However, this may be modified. For example, a torque demand may be computed at a vehicle axle level based on the accelerator opening degree and a vehicle speed (a vehicle traveling speed). Then, the computed torque demand at the vehicle axle level may be converted to a torque demand at the engine shaft level based on an operational parameter(s) of a vehicle drive system, such as a differential gear ratio and/or a transmission gear ratio. Then, this computed torque demand at the engine shaft level may be used as the shaft torque demand.

Furthermore, the present invention is not limited to the gasoline engine and may be applied to any other type of internal combustion engine, such as a diesel engine.

Additional advantages and modifications will readily occur to those skilled in the art. The invention in its broader terms is therefore not limited to the specific details, representative apparatus, and illustrative examples shown and described.

What is claimed is:

1. A torque control apparatus for an internal combustion engine, comprising:
    a combustion stop means for stopping fuel combustion of the engine when a combustion stop condition is satisfied;
    a combustion period torque loss computing means for computing a torque loss of the engine in a combustion period, in which the fuel combustion of the engine takes place, wherein the combustion period torque loss computing means computes the torque loss of the engine based on an operational state of the engine in the combustion period;
    a combustion stop period torque loss computing means for computing a torque loss of the engine in a combustion stop period, in which the fuel combustion of the engine is stopped by the combustion stop means, wherein the combustion stop period torque loss computing means computes the torque loss of the engine in the combustion stop period based on the torque loss of the engine in the combustion period and a state of the combustion stop implemented by the combustion stop means; and a torque control means for controlling a torque generated from the engine based on:
   a torque demand, which is demanded by an operator; and
   a selected one of the torque loss in the combustion period and the torque loss in the combustion stop period, wherein:
in the combustion period, the torque control means uses the torque loss computed by the combustion period torque loss computing means as the selected one of the torque losses; and
in the combustion stop period, the torque control means uses the torque loss computed by the combustion stop period torque loss computing means as the selected one of the torque losses.

2. The torque control apparatus according to claim 1, wherein the combustion stop period torque loss computing means computes the torque loss based on an operational state of the engine in the combustion stop period when the fuel combustion of the engine is stopped by the combustion stop means.

3. The torque control apparatus according to claim 1, wherein the combustion stop period torque loss computing means includes:
   a correction amount computing means for computing a torque loss correction amount based on the state of the combustion stop implemented by the combustion stop means; and
   a correctively computing means for computing the torque loss in the combustion stop period by correcting the torque loss in the combustion period based on the torque loss correction amount.

4. The torque control apparatus according to claim 3, wherein:
   the correction amount computing means computes the torque loss correction amount based on a difference between a theoretical torque loss in the combustion period and a theoretical torque loss in the combustion stop period;
   the theoretical torque loss in the combustion period is obtained based on a torque loss characteristic in the combustion period; and
   the theoretical torque loss in the combustion stop period is obtained based on a torque loss characteristic in the combustion stop period.

5. The torque control apparatus according to claim 3, wherein:
   the engine includes a plurality of cylinders and a combustion stop mode cylinder quantity setting means for variably setting a combustion stop mode cylinder quantity, which is a quantity of one or more deactivated cylinders under a combustion stop mode among the plurality of cylinders; and
   the correction amount computing means computes the torque loss correction amount based on the combustion stop mode cylinder quantity, which is set by the combustion stop mode cylinder quantity setting means.

6. The torque control apparatus according to claim 3, wherein:
   the engine includes a plurality of cylinders and a combustion stop mode cylinder quantity setting means for variably setting a combustion stop mode cylinder quantity, which is a quantity of one or more deactivated cylinders under a combustion stop mode among the plurality of cylinders; and
   the correction amount computing means computes the torque loss correction amount based on a weighting coefficient, which is obtained from a ratio of the combustion stop mode cylinder quantity relative to a total quantity of the plurality of cylinders.

7. A vehicle control system, which controls a plurality of in-vehicle devices including an internal combustion engine of a vehicle in a manner that achieves a torque demand, the vehicle control system comprising the torque control apparatus according to claim 1.

8. The vehicle control system according to claim 7, further comprising a brake control apparatus for controlling a braking operation of a brake system of the vehicle, which serves as one of the in-vehicle devices, wherein the torque control apparatus cooperates with the brake control apparatus to control the torque.

9. A torque control apparatus for an internal combustion engine, comprising:
   a combustion stop means for stopping fuel combustion of the engine when a combustion stop condition is satisfied;
   a first computing means for computing a torque loss of the engine based on a torque loss characteristic in a combustion period, in which the fuel combustion of the engine takes place;
   a second computing means for computing a torque loss of the engine based on a torque loss characteristic in a combustion stop period, wherein the torque loss characteristic in the combustion stop period is different from the torque loss characteristic in the combustion period; and
   a torque loss computing means for computing a conclusive torque loss of the engine based on a selected one of the torque loss computed by the first computing means and the torque loss computed by the second computing means, wherein:
      in the combustion period, the torque loss computing means uses the torque loss computed by the first computing means as the selected one of the torque losses; and
      in the combustion stop period, the torque loss computing means uses the torque loss computed by the second computing means as the selected one of the torque losses; and
   a torque control means for controlling a torque generated from the engine based on a torque demand, which is demanded by an operator, and the conclusive torque loss of the engine.

10. The torque control apparatus according to claim 9, wherein:
   the torque loss computing means uses the torque loss computed by the first computing means as the conclusive torque loss in the combustion period; and
   the torque loss computing means uses the torque loss computed by the second computing means as the conclusive torque loss in the combustion stop period.

11. The torque control apparatus according to claim 9, wherein:

the engine includes a plurality of cylinders and a combustion stop mode cylinder quantity setting means for variably setting a combustion stop mode cylinder quantity, which is a quantity of one or more deactivated cylinders under a combustion stop mode among the plurality of cylinders; and the torque loss computing means computes the conclusive torque loss based on a ratio between:

a combustion mode cylinder quantity, which is a quantity of one or more activated cylinders under a combustion mode among the plurality of cylinders; and the combustion stop mode cylinder quantity.

12. The torque control apparatus according to claim 11, wherein the torque loss computing means includes:

a first torque loss term computing means for computing a first torque loss term by multiplying the torque loss, which is computed by the first computing means, by a first weighting coefficient, which is obtained based on a ratio of the combustion mode cylinder quantity relative to a total quantity of the plurality of cylinders;

a second torque loss term computing means for computing a second torque loss term by multiplying the torque loss, which is computed by the second computing means, by a second weighting coefficient, which is obtained based on a ratio of the combustion stop mode cylinder quantity relative to the total quantity of the plurality of cylinders; and a conclusive torque loss computing means for computing the conclusive torque loss by summing the first torque loss term and the second torque loss term.

13. A vehicle control system, which controls a plurality of in-vehicle devices including an internal combustion engine of a vehicle in a manner that achieves a torque demand, the vehicle control system comprising the torque control apparatus according to claim 9.

14. The vehicle control system according to claim 13, further comprising a brake control apparatus for controlling a braking operation of a brake system of the vehicle, which serves as one of the in-vehicle devices, wherein the torque control apparatus cooperates with the brake control apparatus to control the torque.

* * * * *